United States Patent Office 3,205,261
Patented Sept. 7, 1965

3,205,261
METHOD FOR SEPARATION OF GLUTAMIC ACID
Susumu Asano, Hofu-shi, and Rikichi Maida, Ube-shi, Japan, assignors to Kyowa Hakko Kogyo Co. Ltd., Tokyo, Japan, a corporation of Japan
No Drawing. Filed Nov. 14, 1961, Ser. No. 152,179
Claims priority, application Japan, Sept. 28, 1961, 36/34,657
3 Claims. (Cl. 260—527)

The present invention relates to a method for the separation of glutamic acid, more particularly it relates to a process for the separation of glutamic acid to obtain a higher yield from glutamic acid fermentation broths.

In U.S. Patent No. 3,147,302, issued September 1, 1964, there is disclosed a method for producing glutamic acid, which comprises a combination of a step of (1) concentrating a glutamic acid fermentation broth, either as such, or after filtrating the body of cells, at a comparatively lower temperature below 80° C., (2) a step of heating the concentrate after addition of an acid at 130° to 150° C., and (3) a step of concentrating the filtrate obtained after filtration of the solid substance off, separating glutamic acid hydrochloride isolated after addition of concentrated hydrochloric acid or hydrogen chloride gas, and recovering glutamic acid from the hydrochloride.

In this method, however, no mention was made of recovery of glutamic acid from the liquor resulting after the separation of glutamic acid hydrochloride (named ML-1 hereinafter), and from the mother liquor resulting after the separation of glutamic acid from the glutamic acid hydrochloride solution (named ML-2 hereinafter). According to the ordinary process for the recovery, the mother liquor is further concentrated, or is mixed with the broth of the next procedure to be expected for the recovery of glutamic acid in the posterior stage. In the former instance, however, the resulting glutamic acid is inferior in its purity and is colored, due to impurities such as humin substance and ammonium chloride. Thus the acid as such is not available as the final product. In the latter instance, the impurities involved in the mother liquor are gradually accumulated in the broth, thereby causing difficulties in the process and deterioration in the quality of the resulting glutamic acid.

The inventors have discovered that glutamic acid having substantially similar qualities as that obtained as the primary crystals can be recovered by dissolving the glutamic acid hydrochloride obtained by concentration of ML-1 and having inferior qualities, into ML-2, removing humin substance isolated after or without heating, filtering ammonium chloride isolated after evaporation and cooling, adjusting the pH of the filtrate to 3.2, and cooling to permit the isolation of crystals.

Thus, an object of the invention is to provide an efficient method for the separation of glutamic acid from the mother liquors containing, in addition to the acid, impurities. Another object of the invention is to provide a method for recovery of glutamic acid with a higher purity and quality, by a simple procedure. Other objects and natures of the invention will be apparent from the following description.

According to the present invention, a method for separation of glutamic acid from glutamic acid fermentation broths, is provided, which method comprises concentrating a glutamic acid fermentation broth, either as such, or after filtering the body of cells, at a comparatively low temperature below 80° C., heating the concentrate after addition of an acid to a temperature of 130° to 150° C., concentrating the filtrate after filtering the solid substances off, separating glutamic acid hydrochloride isolated after addition of concentrated hydrochloric acid or hydrogen chloride gas to the concentrate to leave a mother liquor (ML-1), separating glutamic acid isolated from the solution of the glutamic acid hydrochloride by addition of an alkaline material to leave a mother liquor (ML-2), concentrating the mother liquor (ML-1) to separate impure glutamic acid hydrochloride, dissolving the thus obtained impure glutamic acid hydrochloride into the mother liquor (ML-2), removing the impurities, such as humin substance and ammonium chloride, isolated after heating and concentration of the solution, and recovering glutamic acid from the solution. In other words the instant invention constitutes an improvement in the method for separation of glutamic acid from the glutamic acid fermentation broths by concentrating the broths, either as such, or after filtering the body of cells, at a comparatively low temperature below 80° C.; heating the concentrate, after addition of an acid, to a temperature of 130° to 150° C.; concentrating the filtrate, after filtering the solid substances off; separating glutamic acid hydrochloride, isolated after addition of concentrated hydrochloric acid or hydrogen chloride gas to the concentrate, to leave a mother liquor (ML-1); and separating glutamic acid isolated from the solution of the glutamic acid hydrochloride by addition of an alkaline material to leave a mother liquor (ML-2); which improvement comprises concentrating the mother liquor (ML-1) to separate impure glutamic acid hydrochloride, dissolving the thus obtained impure glutamic acid hydrochloride into the mother liquor (ML-2), removing the impurities such as humin substance and ammonium chloride, isolated after heating and concentration of the solution, and recovering glutamic acid from the solution.

Specifically, the mother liquor (ML-1) is concentrated at 70° C. up to ⅕ the volume with concurrent recovery of hydrochloric acid, and cooled to 30° C. The isolated ammonium chloride is then filtered off. The filtrate is added with concentrated hydrochloric acid to adjust the acidity to 6.2 Normal. The acidity mentioned herein means a Normal concentration of the same volume of caustic soda solution required to adjust pH of the solution to 2.0. The filtrate is then cooled, and the isolated glutamic acid hydrochloride is separated by centrifugation. The separated glutamic acid hydrochloride is dissolved into the mother liquor (ML-2), and the pH of the solution is adjusted to from 2.5 to 3.5 with caustic soda. The humin substance isolated after heating the solution at 30° C. for 5 hours is filtered off, and the pH of the filtrate is adjusted to 5.5 with caustic soda, and concentrated with concurrent recovery of sodium chloride. The concentrate is cooled to 5° C., and the isolated ammonium chloride is filtered off. The filtrate is added with concentrated hydrochloric acid to adjust the pH to 3.2, and kept at 5° C. to isolate glutamic acid. The glutamic acid is centrifuged, washed with water, and dried to obtain crystalline glutamic acid.

The invention will be illustrated in connection with the example, which is merely by way of illustration and not by way of limitation.

*Example*

One hundred and fifty liters of a glutamic acid fermentation broth (containing 48 mg./ml. of glutamic acid and 2 mg./ml. of pyrrolidonecarboxylic acid) is concentrated at 60° C. up to about 50 liters volume, added with 30 liters of 20% hydrochloric acid, and heated at 140° C. for 1 hour. After filtering the solid substance off, the filtrate is further concentrated up to 30 liters, and 12 liters of concentrated hydrochloric acid are added. The glutamic acid hydrochloride isolated upon cooling to 5° C. is centrifuged to leave 35 liters of mother liquor (ML-1). The glutamic acid hydrochloride is dissolved in water and the solution is added with caustic soda to adjust the pH to 3.2, and kept at 5° C. The isolated glutamic acid is centrifuged and dried, weighing 6300 grams (98% purity). The mother liquor left (ML-2) is 35 liters.

The 35 liters of the mother liquor (ML-1) (containing 15 mg./ml. of glutamic acid and 40 mg./ml. of ammonium chloride) is concentrated at 70° C. up to 7 liters with concurrent recovery of the hydrochloric acid, and cooled to 30° C. The isolated ammonium chloride is filtered off, and to the filtrate is added 28 liters of concentrated hydrochloric acid, and cooled to 5° C. The isolated glutamic acid hydrochloride is separated, weighing 1660 grams wet (containing 20.8% of glutamic acid and 15.3% of ammonium chloride). The glutamic acid hydrochloride is dissolved in 35 liters of the mother liquor (ML-2) (containing 10 mg./ml. of glutamic acid, 88 mg./ml. of sodium chloride and 26 mg./ml. of ammonium chloride), and to the solution is added 40 milliliters of 40% caustic soda solution to adjust the pH to 3.0, and heated at 30° C. for 5 hours. The isolated humin substance is filtered off, and to the filtrate was added 250 milliliters of 40% caustic soda solution to adjust the pH to 5.5, and concentrated up to about 5 liters volume with concurrent recovery of sodium chloride. Ammonium chloride isolated after cooling to 5° C. is separated by filtration, and to the filtrate is added 400 milliliters of concentrated hydrochloric acid to adjust the pH to 3.2, and kept at 5° C. Thereby glutamic acid is isolated, which is centrifuged, washed with water, and dried to yield 540 grams of glutamic acid of 95% purity. The total yield of glutamic acid based upon the material broth is 89.2%.

What we claim is:

1. In the process for the separation of glutamic acid from a fermentation broth which comprises:
    (a) concentrating glutamic acid fermentation broth at a temperature less than 80° C., whereby a fermentation broth concentrate is formed;
    (b) adding hydrochloric acid to the concentrate and heating the acidified concentrate to a temperature within the range of from 130° to 150° C., whereby solids precipitate;
    (c) filtering off the precipitated solids, whereby filtrate is obtained;
    (d) adding HCl to the filtrate to form glutamic acid hydrochloride therein and separating therefrom glutamic acid hydrochloride which precipitates out, leaving a mother liquor (ML-1);
    (e) dissolving the separated glutamic acid hydrochloride in water, raising the pH of the resulting solution to precipitate glutamic acid therefrom and separating the precipated glutamic acid, leaving a mother liquor (ML-2);

the improvement which comprises concentrating ML-1 at 70° C. to about one fifth its volume with concurrent recovery of hydrochloric acid, cooling the concentrated ML-1 to 30° C., filtering isolated ammonium chloride from the concentrated and cooled ML-1, leaving a filtrate, adding concentrated hydrochloric acid to the filtrate to adjust its acidity to a pH of 2.0, cooling the acid-treated filtrate, separating precipitated glutamic acid hydrochloride and dissolving the separated glutamic acid hydrochloride in ML-2, whereby an enriched ML-2 is formed; and adding caustic soda to the enriched ML-2 to adjust its pH to within the range from 2.5 to 3.5, heating the thus adjusted enriched ML-2 at about 30° C. for about 5 hours, whereby humin substance is precipitated, removing the precipitated humin substance by filtration, leaving filtrate, adding caustic soda to the filtrate to adjust its pH to about 5.5, concentrating the thus-adjusted filtrate with concurrent recovery of sodium chloride, cooling the resulting concentrate to about 5° C., whereby ammonium chloride precipitates, filtering off precipitated ammonium chloride, adding concentrated hydrochloric acid to resulting filtrate to adjust its pH to 3.2, maintaining the adjusted filtrate at 5° C., whereby glutamic acid precipitates, separating the precipitated glutamic acid, water-washing the separated glutamic acid and drying same, whereby crystalline glutamic acid is obtained.

2. A process in claim 1 wherein concentrated hydrochloric acid is employed in step (d) of the process.

3. The process as in claim 1 wherein hydrogen chloride gas is employed in step (d) of the process.

References Cited by the Examiner

UNITED STATES PATENTS

| | | | |
|---|---|---|---|
| 1,940,428 | 12/33 | Masuda | 260—527 |
| 1,973,574 | 9/34 | Marshall | 260—527 |
| 3,029,281 | 4/62 | Motozaki et al. | 260—527 |

LORRAINE A. WEINBERGER, *Primary Examiner.*

CHARLES B. PARKER, LEON ZITVER, *Examiners.*